Oct. 4, 1966   G. J. LISTNER   3,277,046
STABILIZED POLYOLEFIN COMPOSITIONS CONTAINING (A) p-OCTYL PHENYL
SALICYLATE, (B) 2,6 DI-t-BUTYL-p CRESOL, (C) DI-LAURYL
THIODIPROPIONATE AND (D) A CHLORINATED
POLYBIPHENYL AND METHOD OF MAKING SAME
Filed July 9, 1963
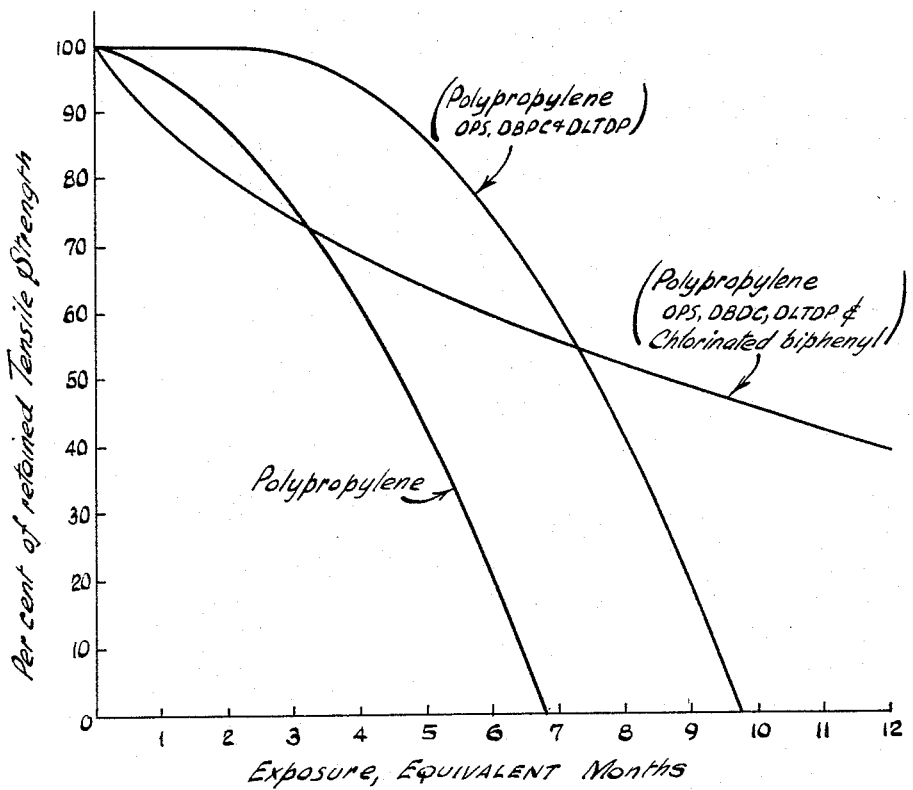
INVENTOR
GREGORY J. LISTNER
BY
ATTORNEY

3,277,046
STABILIZED POLYOLEFIN COMPOSITIONS CONTAINING (A) p-OCTYL PHENYL SALICYLATE, (B) 2,6 DI-t-BUTYL-p CRESOL, (C) DI-LAURYL THIODIPROPIONATE AND (D) A CHLORINATED POLYBIPHENYL AND METHOD OF MAKING SAME
Gregory J. Listner, Franklin Park, N.J., assignor to Johnson & Johnson, a corporation of New Jersey
Filed July 9, 1963, Ser. No. 293,823
17 Claims. (Cl. 260—45.85)

This invention relates to compositions for improving the resistance of poly-α-olefin polymers to degradation on exposure to sunlight and to weathering, and more particularly to the resulting stabilized poly-α-olefin compositions.

The polymers of α-olefins and like ethylenically unsaturated materials, particularly polyethylene and polypropylene of the low, medium and high density varieties, have many desirable characteristics which make them useful in a wide variety of molded and shaped products. These characteristics include their thermoplastic nature, which allows for easy molding, shaping, extruding, fabricating, etc., their inertness and other controllable physical and chemical properties.

Despite these desirable characteristics, thermoplastic poly-α-olefins have been limited in use in certain areas and have been excluded from others because of their tendency to become brittle, form powder on their surfaces, lose strength and darken in color on exposure to light and weathering as is normally encountered in outdoor uses.

Thus, moldings, monofilaments, multi-filaments, fibers, sheets, films and other sections derived from these polymers have a very limited useful life in outdoor applications where exposure to sunlight and oxygen of the air occurs for prolonged periods of time. In such environments, these polymers degrade very rapidly resulting in virtually complete loss of required mechanical properties such as tensile strength, elongation, tear strength, abrasion resistance, etc. As a consequence, the products derived from the polymers have only very limited utility in a vast range of uses, including shade cloth, seed bed covers, sailcloth, automotive upholstery fabrics, rope and cord, boat covers, construction projects, signs, etc.

Certain additives have been employed in the past to overcome this sunlight degradation. One such treatment is incorporating finely dispersed carbon black particles in the polymer but this of course conveys a black color to any article so treated. Some of the other substances used also impart dark colors to the polymer or result in opacity, or in other ways impair the properties of the final product.

Proposals have been made to incorporate various anti-oxidants and various ultra-violet light-absorbing materials into the polymer, or combinations of these two, but the anti-oxidants normally employed are rapidly consumed during the decomposition of the polymer due to weathering and the ultra-violet absorbents are only active for short durations due to the decomposition of the absorbing material or because they migrate to the surface of the polymer and are volatilized. Furthermore, compatibility of various absorbers and anti-oxidants with the olefin polymers is very limited.

In copending, commonly assigned application Serial No. 216,040, filed August 10, 1962, now abandoned, there is disclosed an improved composition for stabilizing polyolefinic materials against sunlight and weathering. This composition comprises in certain concentrations p-octylphenyl salicylate (OPS), 2,6-di-tertiarybutyl-p-cresol (DBPC), and di-lauryl-thiodipropionate (DLTDP). This composition has been found excellent for the stabilization of polyolefinic polymers and is presently being use for this purpose.

However, I have now discovered that by adding certain chlorinated polyphenyl compounds in specific amounts to specific concentrations of p-octylphenyl salicylate, 2,6-di-tertiarybutyl-p-cresol and di-lauryl-thiodipropionate that we can dramatically and drastically increase the stability of polyolefinic material when it is exposed to the sunlight and/or the weather. The improved compositions of the present invention retain a considerable portion of their tensile strength even when exposed to the sun and weather for long periods of time. They also retain a portion of their elongation after lengthy exposures to sun and weather. Furthermore, the improved compositions of the present invention stop powdering on the surface of polyolefins which are exposed to sun and weather.

The composition of the present invention when incorporated in filaments of poly-α-olefins soften the resultant filament giving it a pleasing hand and feel without detracting from the desirable strength properties of the poly-α-olefin.

In extruding poly-α-olefin materials to form filaments the poly-α-olefin should have a narrow range of melt flow rate in order to obtain continuous, uniform formation of the filament. Usually for polypropylene the melt flow rate will be around 4.0 and will vary very little from this figure. However, when the compositions of the present invention are incorporated in the poly-α-olefin material the criticality of the melt flow rate is removed and poly-α-olefin materials having varying melt flow rates and broad ranges of melt flow rates may be extruded continuously and uniformly into filaments. For example, I have found that I may extrude polypropylene having a melt flow rate ranging from 3 to 7 into commercially acceptable filaments when the composition of the present invention is incorporated with the polypropylene prior to extrusion.

As previously mentioned poly-α-olefinic additives very often reduce the clarity of the olefinic material and make it milky or opaque. However, when using the compositions of the present invention the poly-α-olefinic materials lose none of their original clarity and if desired, their clarity may be improved by the addition of up to 5% of mineral oil to the compositions of the present invention. Addition of such minor amounts of mineral oil produces a crystal clear poly-α-olefin material which maintains its clarity even after lengthy exposures to sun and weather.

The chlorinated polyphenyl compounds which may be used in accordance with the present invention are any of the biphenyl or triphenyl compounds containing from about 20% to 70% by weight of chlorine or blends of chlorinated biphenyls and triphenyls containing from about 20 to 70% chlorine. Suitable examples of such chlorinated polyphenyl compounds are chlorinated biphenyl containing 60% by weight chlorine, chlorinated triphenyl containing 60% by weight chlorine, and a blend of chlorinated triphenyl and chlorinated biphenyl containing 65% by weight chlorine, etc.

The invention is practiced by uniformly incorporating into the polymer a mixture of from about ½% to about 5% p-octylphenyl salicylate (OPS), from about 0.1% to 4% di-lauryl-thiodipropionate (DLTDP), from about ¼% to about 2% 2,6-di-tertiarybutyl-p-cresol (DBPC), and from about 1% to about 30% or more of a chlorinated polyphenyl compound. If less than about 1% of the chlorinated polyphenyl is used in the compositions of the present invention there is little enhancement of the stability of the polyolefin. Whereas, if more than about 30% of the chlorinated polyphenyl is used the resultant polyolefin material becomes tacky.

Within the more commercial aspects of the present invention the use of from about 1% to about 3% of the p-octylphenyl salicylate, from about ¼% to about 2% of the di-lauryl-thiodipropionate, from about ½% to about 1% of the 2,6-di-tertiarybutyl-p-cresol, and from about 8% to about 12% of the chlorinated polyphenyl compound is desired.

The incorporation of the additives into the polymer can be done by any one of several methods that insure uniform distribution. For example, if the clorinated polyphenyl compound is a liquid the other compounds may be dissolved in the chlorinated polyphenyl compound and the combination then mixed with warm polymer, or if all compounds are solids they may be mixed by hot milling such as a two-roll heated mill or by melting of the additives together and coating this mixture uniformly on the small pellet particles of the warm polymer, allowing the mixture to cool after thorough mixing, or by dissolving the additives in solvents such as xylene and toluene and then mixing with the polymer in powder, flake or pellet form. Other methods of blending the components may also be employed, such as extrusion mixing, etc.

In most instances it is difficult to uniformly disperse additives in the poly-α-olefin polymer. It is believed that this is caused by the fact that a true solution is not formed but that the additive molecules simply disperse themselves, at random, in and amongst the olefin molecules.

I have discovered that the compositions of the present invention may be readily incorporated in poly-α-olefin polymers with extreme uniformity by first dissolving the p-octylphenyl salicylate, 2,6-di-tertiarybutyl-p-cresol and di-lauryl-thiodipropionate in the warm chlorinated polyphenyl compound. The chlorinated polyphenyl solution is poured over the poly-α-olefin polymer which has been pre-warmed to a temperature of from about 100° F. to about 275° F. or higher but not as high as the melting point of the olefin polymer. The olefin polymer coated with the chlorinated polyphenyl solution is baked at a temperature of from about 200° F. to 300° F. for a period of from about ½ hour to 8 hours or more and the poly-α-olefin polymer uniformly absorbs the chlorinated polyphenyl solution.

The quantity of each of the additives to be employed will in general depend upon the amount of stability required. Certain important limits have been defined to obtain the maximum effect, however.

The normal procedure in evaluating the light stability of olefinic materials has been to expose samples of film, filament, fabric, or other forms to outdoor sunlight and weathering in a location where the annual amount of sunlight is very high, such as in southern Florida or Arizona. Such testing often involves lengthy periods of time to evaluate the better stabilizer systems, and consequently an accelerated test has been greatly sought by the industry.

An efficient laboratory tester has been devised that greatly accelerates testing of the poly-α-olefn materials and correlates very well with Florida and Arizona exposures. This accelerated tester is not a part of the present invention, but some of the data cited herein were obtained by means of this accelerator test. As indicated, correlation with the actual outdoor exposure is well-established.

Although the principles of the present invention are being described with particular reference to isotactic polypropylene as the preferred poly-α-olefin, it is to be appreciated that the practice of the invention is beneficial to other poly-α-olefins, notably polyethylene. It is also to be noted that the invention is applicable to copolymers or polyallomers of poly-α-olefins either of different species of the same poly-α-olefin, such as a blend of low molecular weight polyethylene and high molecular weight polyethylene or of different poly-α-olefins such as polyethylene-polypropylene, polyethylene-polybutylene, etc. In its broader aspects the invention is thus applicable to any poly-α-olefin or to mixtures of or combinations thereof in the form of blends, copolymers, polyallomers, etc., which are susceptible to light-induced degradation.

Referring to the drawings, there is shown in the figure a graph wherein the percent retained tensile strength of monofilaments is plotted against the equivalent months of exposure as determined by the accelerated tester previously described. In all instances the filament size and other characteristics except additives are the same, and the filaments are tested under fabric conditions at temperatures of 75° to 80° C. Plotted on the graph are the determinations for a 100% polypropylene filament, a polypropylene filament stabilized with the composition of p-octylphenyl salicylate (OPS), di-lauryl-thiodipropionate (DLTDP), and 2,6-di-tertiary butyl-p-cresol (DBPC), and a polypropylene filament containing the composition of the present invention, i.e., OPS, DBPC, DLTDP and chlorinated biphenyl. As may be seen from the graph, not only does the composition of the present invention drastically increase the percent retained tensile strength of the polypropylene filament after considerable exposure, but in fact completely changes the slope and configuration of the curve. Polypropylene by itself degrades extremely rapidly after 2 to 3 months' exposure and polypropylene containing some stabilizer degrades vary rapidly during the 6th to 9th or 10th month of exposure. The filaments of the present invention, even after 10 months of exposure, degrade slowly and maintain a higher percent of their tensile strength after a considerable longer exposure than previous type stabilized polyolefin filaments.

The invention will be further illustrated in greater detail by the following specific examples. It should be understood, however, that although these examples may describe in particular detail some of the more specific features of the invention they are given primarily for purposes of illustration and the invention in its broader aspects is not to be construed as limited thereto.

*Example 1*

A mixture of 3 pounds of OPS, ½ pound DBPC and ½ pound DLTDP is melted on a steam bath and then tumbled with 100 pounds of isotactic polypropylene pellets (a general purpose UV-unstabilized extrusion resin) which is warmed to about 120° F. The tumbled material is allowed to cool to room temperature. The pellets, uniformly coated with the additive mixture, are extruded through a 1-inch laboratory extruder into .015-inch diameter monofilaments, quenched in cold water, and oriented 6:1 to give 0.006-inch monofilaments. The monofilaments are exposed to an equivalent of 8 months' Florida exposure, 9 months' Florida exposure and 10 months' Florida exposure. At the end of each period the monofilaments are tested to determine the retained tensile strength as a percentage of the equivalent original tensile strength. After 8 months' exposure the retained tensile strength is 58%, after 9 months it is 33%, and after 10 months it is approximately 4%. After 9 months' equivalent exposure the filament is also tested for percentage of retained elongation and is found to retain about 23% of its original elongation.

*Example 2*

A mixture of 1 pound of OPS, ½ pound DBPC and ½ pound DLTDP is dissolved in 10 pounds of warm chlorinated biphenyl containing 60% by weight chlorine. 100 pounds of isotactic polypropylene pellets are warmed to about 120° F. and the above mixture poured over the heated pellets with mixing to coat each pellet. The coated pellets are heated for two (2) hours at a temperature of 220° F. and the chlorinated biphenyl solution uniformly absorbed by the polypropylene pellets. The material is allowed to cool to room temperature and the pellets obtained are dry and free flowing. The pellets are extruded as described in Example 1 to form .006-inch monofilaments. The monofilaments are exposed to the accelerated laboratory tester to an equivalent of 8 months' Florida exposure, 9 months' Florida exposure and 10 months' exposure. At the end of this period the monofilaments are tested to determine the retained tensile strength as a percentage of the original tensile strength. The retained tensile strength after 8 months' exposure is 53%, after 9 months' exposure it is 48%, and after 10 months' exposure it is 45%. In this instance the composition of the present invention after 8 months' equivalent exposure retained approximately the same amount of tensile strength as did the composition of Example 1. After 9, 10 and more months of exposure the decrease in retained tensile is gradual while in the composition of Example 1 the retained tensile of the filament after 10 months' equivalent exposure is virtually nil.

The filament of this example is also tested for percent retained elongation after 9 months' equivalent Florida exposure and is found to retain 42% of its original elongation.

Example 3

The procedure set forth in Example 2 is followed with the exception that the mixture contains 2 pounds OPS, 1 pound DBPC, ½ pound DLTDP, and 10 pounds of the chlorinated biphenyl and 100 pounds of polypropylene pellets. The extruded monofilaments are tested after 8, 9 and 10 months' equivalent exposure. The retained tensile strength is found to be 58% after 8 months, 56% after 9 months, and 53% after 10 months. After 9 months' equivalent exposure the percent retained elongation of this filament is found to be 45%.

Example 4

10 pounds of chlorinated biphenyl containing 60% by weight chlorine is warmed and mixed with 100 pounds isotactic polypropylene pellets. The mixture is heated and extruded to form a .006-inch monofilament as described in Example 2. The extruded monofilament is tested after 8 and 10 months' equivalent exposure and the retained tensile is found to be 17% after 8 months and 8% after 10 months. The percent of retained elongation of this filament after 10 months' equivalent exposure is found to be only 4%. This is a complete failure of the monofilament.

Example 5

The procedure set forth in Example 2 is followed with the exception that 4.5 pounds OPS, 2 pounds DBPC, 3 pounds DLTDP, and 20 pounds chlorinated triphenyl containing 60% by weight chlorine are mixed with 100 pounds of isotactic polypropylene pellets and extruded. The extruded monofilaments are tested after 8 and 10 months' equivalent exposure and the retained tensile strengths are found to be 60% after 8 months and 56% after 10 months.

Example 6

The procedure set forth in Example 2 is followed with the exception that ½ pound OPS, ¼ pound DBPC, ¼ pound DLTDP, and 7 pounds of a mixture of chlorinated biphenyl and chlorinated triphenyl containing 65% by weight chlorine are mixed with 100 pounds of isotactic polypropylene pellets and extruded. The extruded monofilaments are tested after 8 and 10 months' equivalent exposure and the retained tensile strengths are found to be 51% after 8 months and 42% after 10 months.

Example 7

A base resin of a UV stabilized polyethylene-polypropylene-polyallomer, which is a block copolymer of stereo-regular ethylene units distributed through isotactic polypropylene, is extruded into 7-mil diameter monofilaments without the addition of any stabilizing additives. At the end of 8 months' equivalent exposure to the laboratory accelerator tester the retained tensile strength of a monofilament is determined to be less than 4% of the original tensile strength and the retained elongation is found to be less than 8% of the original elongation. This is a complete failure of the filament.

Example 8

The procedure of Example 2 is followed with the exception that 100 pounds of a polyethylene-polypropylene-polyallomer is substituted for the isotactic polypropylene. The extruded monofilaments are tested after 8, 9 and 10 months' equivalent exposure and the retained tensile after 8 months is 62%, after 9 months it is 56%, and after 10 months it is 52%, as contrasted to the 4% value obtained for the base resin.

Although several specific examples of the inventive concept have been described the same should not be construed as limited thereby nor to the specific features mentioned therein but to include various other equivalent features as set forth in the claims appended hereto. It is understood that any suitable changes, modifications and variations may be made without departing from the spirit and scope of the invention.

I claim:

1. A stabilized solid poly-α-olefin composition comprising: a poly-α-olefin, from about ½% to about 5% p-octylphenyl salicylate, from about ¼% to about 2% of 2,6-di-tertiarybutyl-p-cresol, from about 0.1% to about 4% of di-lauryl-thiodipropionate and from about 1% to about 30% of a chlorinated polyphenyl compound selected from the group consisting of chlorinated biphenyl, chlorinated triphenyl, and blends of chlorinated biphenyl and chlorinated triphenyl, said chlorinated polyphenyl compounds containing from about 20% to 70% by weight of chlorine.

2. A stabilized solid poly-α-olefin composition comprising: a poly-α-olefin, from about 1% to about 3% of p-octylphenyl salicylate, from about ½% to about 1% of 2,6-di-tertiarybutyl-p-cresol, from about ¼% to about 2% of di-lauryl-thiodipropionate and from about 8% to about 12% of a chlorinated polyphenyl compound selected from the group consisting of chlorinated biphenyl, chlorinated triphenyl, and blends of chlorinated biphenyl and chlorinated triphenyl, said chlorinated polyphenyl compounds containing from about 20% to 70% by weight of chlorine.

3. A stabilized solid polypropylene composition comprising: polypropylene, from about ½% to about 5% of p-octylphenyl salicylate, from about ¼% to about 2% of 2,6-di-tertiarybutyl-p-cresol, from about 0.1% to about 4% of di-lauryl-thiodipropionate and from about 1% to about 30% of a chlorinated polyphenyl compound selected from the group consisting of chlorinated biphenyl, chlorinated triphenyl, and blends of chlorinated biphenyl and chlorinated triphenyl, said chlorinated polyphenyl compounds containing from about 20% to 70% by weight of chlorine.

4. A stabilized solid polypropylene composition comprising: polypropylene, from about 1% to about 3% of p-octylphenyl salicylate, from about ½% to about 1% of 2,6-di-tertiarybutyl-p-cresol, from about ¼% to about 2% of di-lauryl-thiodipropionate and from about 8% to about 12% of a chlorinated polyphenyl compound selected from the group consisting of chlorinated biphenyl, chlorinated triphenyl, and blends of chlorinated biphenyl and chlorinated triphenyl, said chlorinated polyphenyl compounds containing from about 20% to 70% by weight of chlorine.

5. A stabilized solid poly-α-olefin composition comprising: a poly-α-olefin, from about ½% to about 5% of p-octylphenyl salicylate, from about ¼% to about 2% of 2,6-di-tertiarybutyl-p-cresol, from about 0.1% to about 4% of di-lauryl-thiodipropionate and from about 1% to about 30% of chlorinated biphenyl containing from about 20% to 70% by weight of chlorine.

6. A stabilized solid poly-α-olefin composition comprising: a poly-α-olefin, from about 1% to about 3% of p-octylphenyl salicylate, from about ½% to about 1% of 2,6-di-tertiarybutyl-p-cresol, from about ¼% to about 2% of di-lauryl-thiodipropionate and from about 8% to about 12% of chlorinated biphenyl containing from about 20% to 70% by weight of chlorine.

7. A stabilized solid poly-α-olefin composition comprising: a poly-α-olefin, from about ½% to about 5% of p-octylphenyl salicylate, from about ¼% to about 2% of 2,6-di-tertiarybutyl-p-cresol, from about 0.1% to about 4% of di-lauryl-thiodipropionate and from about 1% to about 30% of chlorinated triphenyl containing from about 20% to 70% by weight of chlorine.

8. A stabilized solid poly-α-olefin composition comprising: a poly-α-olefin, from about ½% to about 5% of p-octylphenyl salicylate, from about ¼% to about 2% of 2,6-di-tertiarybutyl-p-cresol, from about 0.1% to about 4% of di-lauryl-thiodipropionate and from about 1% to about 30% of chlorinated biphenyl containing about 60% by weight chlorine.

9. A stabilized solid poly-α-olefin composition comprising: a poly-α-olefin, from about 1% to about 3% of p-octylphenyl salicylate, from about ½% to about 1% of 2,6-di-tertiarybutyl-p-cresol, from about ¼ to about 2% of di-lauryl-thiodipropionate and from about 8% to about 12% of chlorinated biphenyl containing about 60% by weight chlorine.

10. A stabilized solid polypropylene composition comprising: polypropylene, from about 1% to about 3% of p-octylphenyl salicylate, from about ½% to about 1% of 2,6-di-tertiarybutyl-p-cresol, from about ¼% to about 2% of di-lauryl-thiodipropionate and from about 8% to about 12% of chlorinated biphenyl containing about 60% by weight chlorine.

11. A method of making a sunlight-stable and weather-stable poly-α-olefin shaped article of manufacture which comprises: dissolving p-octylphenyl salicylate, 2,6-di-tertiarybutyl-p-cresol and di-lauryl-thiodipropionate in a chlorinated polyphenyl compound to form a solution, mixing said solution with a poly-α-olefin polymer, heating said mixture to a temperature of from about 200° F. to 300° F. for a period of from about ½ hour to 8 hours whereby the poly-α-olefin uniformly absorbs said solution and forming said mixture into a shaped article.

12. A method of making a sunlight-stable and weather-stable poly-α-olefin shaped article of manufacture which comprises: dissolving p-octylphenyl salicylate, 2,6-di-tertiarybutyl-p-cresol and di-lauryl-thiodipropionate in a chlorinated polyphenyl compound to form a solution, mixing said solution with a poly-α-olefin polymer, heating said mixture to a temperature of from about 200° F. to 300° F. for a period of from about ½ hour to 8 hours whereby the poly-α-olefin uniformly absorbs said solution, cooling said mixture to room temperature and forming said mixture into a shaped article.

13. A method of making a sunlight-stable and weather-stable poly-α-olefin shaped article of manufacture which comprises: dissolving p-octylphenyl salicylate, 2,6,-di-tertiarybutyl-p-cresol and di-lauryl-thiodipropionate in a chlorinated polyphenyl compound to form a solution, mixing said solution with a poly-α-olefin polymer heated to a temperature of from about 100° F. to 275° F., heating said mixture to a temperature of from about 200° F. to 300° F. for a period of from about ½ hour to 8 hours whereby the poly-α-olefin uniformly absorbs said solution, cooling said mixture to room temperature and forming said mixture into a shaped article.

14. A method of making a sunlight-stable and weather-stable poly-α-olefin filament which comprises: dissolving p-octylphenyl salicylate 2,6-di-tertiarybutyl-p-cresol and di-lauryl-thiodipropionate in a chlorinated polyphenyl compound to form a solution, mixing said solution with a poly-α-olefin polymer heated to a temperature of from about 100° F. to 275° F., heating said mixture to a temperature of from about 200° F. to 300° F. for a period of from about ½ hour to 8 hours whereby the poly-α-olefin uniformly absorbs said solution, cooling said mixture to room temperature and extruding said mixture to form a filament.

15. A method of making a sunlight-stable and weather-stable polypropylene shaped article of manufacture which comprises: dissolving p-octylphenyl salicylate, 2,6-di-tertiarybutyl-p-cresol and di-lauryl-thiodipropionate in a chlorinated polyphenyl compound to form a solution, mixing said solution with a polypropylene polymer, heating said mixture to a temperature of from about 200° F. to 300° F. for a period of from about ½ hour to 8 hours whereby the polypropylene uniformly absorbs said solution and forming said mixture into a shaped article.

16. A method of making a sunlight-stable and weather-stable polypropylene shaped article of manufacture which comprises: dissolving p-octylphenyl salicylate, 2,6-di-tertiarybutyl-p-cresol and di-lauryl-thiodipropionate in a chlorinated polyphenyl compound to form a solution, mixing said solution with a polypropylene polymer heated to a temperature of from about 100° F. to 275° F., heating said mixture to a temperature of from about 200° F. to 300° F. for a period of from about ½ hour to 8 hours whereby the polypropylene uniformly absorbs said solution, cooling said mixture to room temperature and forming said mixture into a shaped article.

17. A method of making a sunlight-stable and weather-stable polypropylene filament which comprises: dissolving p-octylphenyl salicylate, 2,6-di-tertiarybutyl-p-cresol and di-lauryl-thiodipropionate in a chlorinated polyphenyl compound to form a solution, mixing said solution with a polypropylene polymer heated to a temperature of from about 100° F. to 275° F., heating said mixture to a temperature of from about 200° F. to 300° F. for a period of from about ½ hour to 8 hours whereby the polypropylene uniformly absorbs said solution, cooling said mixture to room temperature and extruding said mixture to form a filament.

References Cited by the Examiner

FOREIGN PATENTS 625,759   1/1963   Belgium.

LEON J. BERCOVITZ, *Primary Examiner.*

G. W. RAUCHFUSS, Jr., *Assistant Examiner.*